United States Patent
Zheng et al.

(10) Patent No.: US 10,171,850 B2
(45) Date of Patent: Jan. 1, 2019

(54) TRUNK MANAGEMENT METHOD AND APPARATUS FOR VIDEO SURVEILLANCE SYSTEMS

(71) Applicant: HANGZHOU HIKVISION SYSTEM TECHNOLOGY CO., LTD., Hangzhou (CN)

(72) Inventors: Yang Zheng, Hangzhou (CN); Dajiang Huang, Hangzhou (CN); Zhenbo Chen, Hangzhou (CN)

(73) Assignee: Hangzhou Hikvision System Technology Co., Ltd. (CN)

( * ) Notice: Subject to any disclaimer, the term of this patent is extended or adjusted under 35 U.S.C. 154(b) by 0 days.

(21) Appl. No.: 14/758,003

(22) PCT Filed: May 30, 2013

(86) PCT No.: PCT/CN2013/076509
§ 371 (c)(1),
(2) Date: Jun. 26, 2015

(87) PCT Pub. No.: WO2014/127591
PCT Pub. Date: Aug. 28, 2014

(65) Prior Publication Data
US 2015/0350699 A1   Dec. 3, 2015

(30) Foreign Application Priority Data

Feb. 25, 2013  (CN) .......................... 2013 1 0059610

(51) Int. Cl.
*H04N 7/173* (2011.01)
*H04N 21/2385* (2011.01)
(Continued)

(52) U.S. Cl.
CPC ........... *H04N 21/2385* (2013.01); *H04N 7/18* (2013.01); *H04N 7/181* (2013.01);
(Continued)

(58) Field of Classification Search
CPC ............ H04N 21/234; H04N 21/2668; H04N 21/43632; H04N 21/6168;
(Continued)

(56) References Cited

U.S. PATENT DOCUMENTS 6,310,889 B1 * 10/2001 Parsons .................. H04L 12/24
370/401
2004/0125777 A1 * 7/2004 Doyle ................... H04W 48/18
370/338
(Continued)

FOREIGN PATENT DOCUMENTS

CN      1968101      5/2007
CN      101646071    2/2010
(Continued)

OTHER PUBLICATIONS

International search report for International application No. PCT/CN2013/076509, dated Nov. 28, 2013 (4 pages).

*Primary Examiner* — Nasser M Goodarzi
*Assistant Examiner* — An V Nguyen
(74) *Attorney, Agent, or Firm* — McDonnell Boehnen Hulbert & Berghoff LLP (57) ABSTRACT

The present invention relates to the video surveillance field, and discloses a trunk management method and apparatus for video surveillance systems. In the present invention, the connection priority of a surveillance equipment is the highest priority amon/between priorities of all clients, when multiple clients with different priorities access the same surveillance equipment. The connection priority of the surveillance equipment is set as the priority of a new client, if the new client accesses the surveillance equipment and the priority of the new client is higher than the connection priority of the surveillance equipment; the connection priority of the surveillance equipment is remained unchanged, if the priority of the new client is not higher than the
(Continued)

connection priority of the surveillance equipment. It is all required to supply a service for each video request of the users when the network bandwidth does not reach full load; the video requests of users having lower priorities will be denied when the network bandwidth is at full load, which can more reasonably utilize the network resources based on the connection management of client priorities to avoid a congestion even a paralysis on networks.

8 Claims, 7 Drawing Sheets (51) Int. Cl.
*H04N 7/18* (2006.01)
*H04N 21/239* (2011.01)
*H04N 21/2383* (2011.01)
*H04N 21/4223* (2011.01)
*H04N 21/2743* (2011.01)
*H04N 21/258* (2011.01)
*H04N 7/24* (2011.01)

(52) U.S. Cl.
CPC ..... *H04N 21/2383* (2013.01); *H04N 21/2396* (2013.01); *H04N 21/25808* (2013.01); *H04N 21/2743* (2013.01); *H04N 21/4223* (2013.01); *H04N 2007/246* (2013.01)

(58) Field of Classification Search
CPC ........... H04N 21/44245; H04N 21/231; H04N 21/6193; H04N 21/2408; H04N 21/23106; H04N 21/44209; H04N 21/8146; H04N 21/2543; H04N 21/2743; H04N 21/2381; H04N 21/2541; H04N 21/8586; H04N 21/816; H04N 21/2665; H04N 21/43
USPC ..... 725/96, 109, 10, 34, 127, 124, 116, 107, 725/62, 135, 147, 105, 115, 82, 32, 25, 725/132, 38, 68, 78; 709/204, 219; 702/58; 370/338
See application file for complete search history.

(56) References Cited

U.S. PATENT DOCUMENTS

| | | | | |
|---|---|---|---|---|
| 2009/0222223 A1* | 9/2009 | Walters | ................... | G01R 31/44 702/58 |
| 2010/0195974 A1* | 8/2010 | Zheng | ...................... | H04N 5/76 386/343 |
| 2012/0281095 A1* | 11/2012 | Trenciansky | ............ | H04N 7/18 348/159 |
| 2013/0339451 A1* | 12/2013 | Nyberg | .................. | H04L 5/0064 709/204 |
| 2014/0074987 A1* | 3/2014 | Martz | .................. | G06F 21/6272 709/219 |
| 2015/0237086 A1* | 8/2015 | Bjurel | ................... | H04L 65/403 348/14.08 |

FOREIGN PATENT DOCUMENTS

| | | |
|---|---|---|
| CN | 101729864 | 6/2010 |
| CN | 101883104 | 11/2010 |
| CN | 101997720 | 3/2011 |

\* cited by examiner

TRUNK MANAGEMENT METHOD AND APPARATUS FOR VIDEO SURVEILLANCE SYSTEMS

TECHNICAL FIELD

The present invention relates to the video surveillance field, especially relates to a trunk management technology for video surveillance systems.

BACKGROUND

Figure 1:
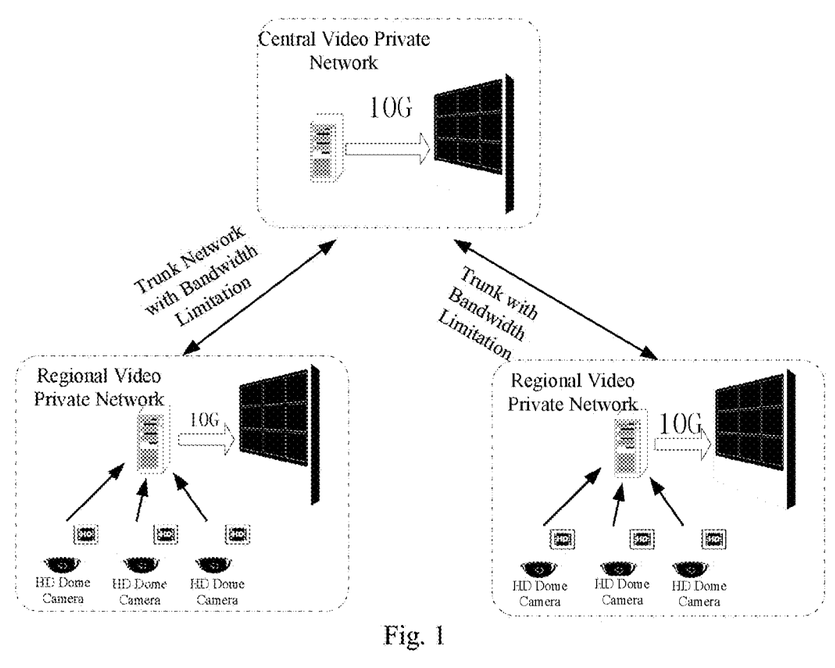
FIG. 1 shows a cross-regional video surveillance system in prior art.

Scenes shown as FIG. 1 usually exist in many applications of video surveillance systems of the security industry, that is, a center and regions have their own video surveillance systems, and internal video surveillance networks of the regions are local area networks without bandwidth limitations, however, the regions connect each other by a backbone network with bandwidth limitations, and the center accesses video surveillance services of each region by the backbone network. As there is a network bandwidth limitation, if an effective management is not performed, it will easily leads to congestion on these trunk networks, even a network paralysis when serious. Therefore, it is required to perform a video traffic control and management on the backbone network with bandwidth limitations, and video services are selectively supplied to users using some strategies.

SUMMARY OF THE INVENTION

The purpose of the present invention is to provide a trunk management method and apparatus for video surveillance systems, bandwidth bottlenecks between regions are solved using the trunk management method based on the connection management of client priorities.

To solve above technical problems, one embodiment of the present invention discloses a trunk management method for video surveillance systems. The video surveillance system includes a first video server, multiple clients and multiple surveillance equipments, and a priority is distributed to every client by the video surveillance system in advance. The method includes the following steps:

sending a video service request to a first surveillance equipment by a first client;

establishing a new connection with the first video server by the first client;

determining whether there is an existing video connection between the first video server and the first surveillance equipment, establishing a new video connection between the first video server and the first surveillance equipment, if there is not an existing video connection; further querying priorities of all clients connecting with the first surveillance equipment, if there is an existing connection, updating the connection priority of the first surveillance equipment as the priority of the first client, if the priority of the first client is higher than the highest priority among the priorities of all the clients connecting with the first surveillance equipment; otherwise, remaining the existing connection priority of the first surveillance equipment unchanged.

Another embodiment of the present invention also discloses a trunk management apparatus for video surveillance systems. The video surveillance system includes a first video server, multiple clients and multiple surveillance equipments, and a priority is distributed to every client by the video surveillance system in advance. The trunk management apparatus includes:

a service requesting unit configured to send a video service request of a first client to a first surveillance equipment;

a first connecting unit configured to establish a new connection between the first client and the first video server;

a first determining unit configured to determine whether there is an existing video connection between the first video server and the first surveillance equipment;

a second connecting unit configured to establish a new video connection between the first video server and the first surveillance equipment, when the first determining unit determines that there is not an existing connection between the first video server and the first surveillance equipment;

a first querying unit configured to query priorities of all clients connecting with the first surveillance equipment, when the first determining unit determines that there is an existing video connection between the first video server and the first surveillance equipment;

a second determining unit configured to determine whether the priority of the first client is higher than the highest priority among the priorities of all the clients connecting with the first surveillance equipment;

a priority confirming unit configured to update the connection priority of the first surveillance equipment as the priority of the first client, when the second determining unit determines that the priority of the first client is higher than the highest priority mong/between the priorities of all the clients connecting with the first surveillance equipment; and to remain the existing connection priority of the first surveillance equipment unchanged, when the second determining unit determines that the priority of the first client is not higher than the highest priority mong/between the priorities of all clients connecting with the first surveillance equipment.

Compared to the prior art, main differences and effects of the embodiments of the present invention are:

The connection priority of a surveillance equipment is the highest priority mong/between priorities of all clients, when multiple clients with different priorities access the same surveillance equipment. If the surveillance equipment is accessed by a new client and the priority of the new client is higher than the connection priority of the surveillance equipment, then the connection priority of the surveillance equipment is set as the priority of the new client; if the priority of the new client is not higher than the connection priority of the surveillance equipment, then the connection priority of the surveillance equipment is remained unchanged. And bandwidth bottlenecks between regions are solved using the trunk management method based on the connection management of client priorities.

Furthermore, it is all required to supply a service for each video request of the users when the network bandwidth does not reach full load; video requests of the users having low priorities will be denied when the network bandwidth is at full load, which can more reasonably utilize the network resources according to the difference of the priorities of users.

Furthermore, the bandwidth resource can be seized by the user having a high priority when the network bandwidth is at full load, thus the bandwidth resource of the user having a low priority will be seized. The video service is selectively supplied to the user, which can avoid a congestion even a paralysis on networks and better control and manage the video traffic.

DETAILED DESCRIPTION OF THE PREFERRED EMBODIMENTS

The following description provides a plenty of technical details for readers to better understand this application. Those who skilled in the art will understand, however, these technical solutions required to be protected in the claims of the present invention can be practiced without many of these technical details and not based on all kinds of changes and modifications in following embodiments.

Embodiments of the present invention will be further described in detail with reference to the drawings so that purposes, technical solutions and advantages of the present invention will become clearer.

Figure 2:
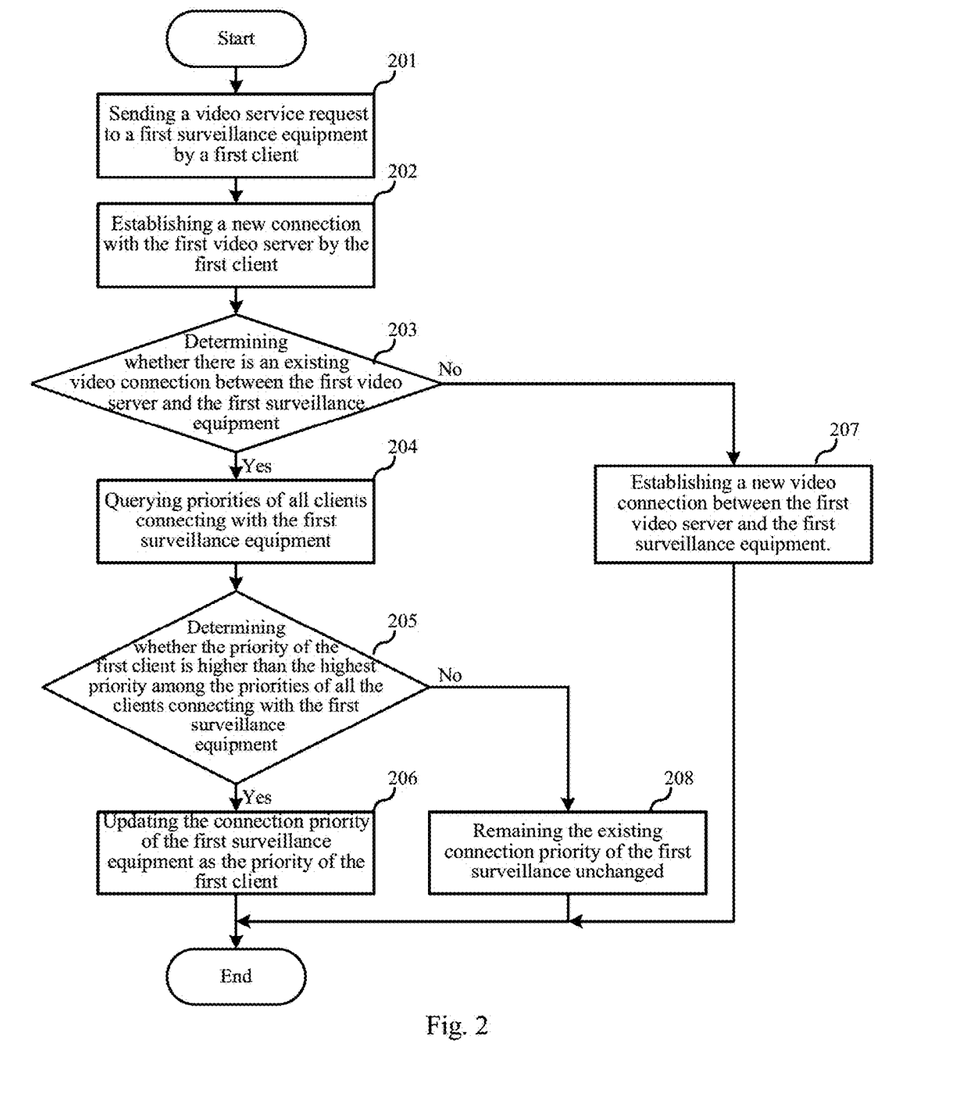
FIG. 2 shows a flow chart of a trunk management method for video surveillance systems according to the first embodiment of the present invention.

The first embodiment of the present invention relates to a trunk management method for video surveillance systems. FIG. 2 shows a flow chart of the trunk management method for video surveillance systems. The video surveillance system includes a first video server, multiple clients and multiple surveillance equipments, and a priority is distributed to every client by the video surveillance system in advance.

Specifically, as shown in FIG. 2, the trunk management method for video surveillance systems includes the following steps:

In step 201, sending a video service request to a first surveillance equipment by a first client.

Then proceeds to step 202, establishing a new connection with the first video server by the first client.

Then proceeds to step 203, determining whether there is an existing video connection between the first video server and the first surveillance equipment.

If it is, then proceeds to step 204; if it is not, then proceeds to step 207.

If there is not, the first video server and the first surveillance equipment establish a new video connection. If there is, priorities of all clients connecting with the first surveillance equipment is (are) further queried.

In step 204, querying priorities of all clients connecting with the first surveillance equipment.

Then proceeds to step 205, determining whether the priority of the first client is higher than the highest priority among the priorities of all the clients connecting with the first surveillance equipment.

If it is, then proceeds to step 206; if it is not, then proceeds to step 208.

The connection priority of the first surveillance equipment is updated as the priority of the first client, if the priority of the first client is higher than the highest priority among/or between the priorities of all the clients connecting with the first surveillance equipment. Otherwise, the existing connection priority of the first surveillance equipment is remained unchanged.

In step 206, updating the connection priority of the first surveillance equipment as the priority of the first client.

Then ends the flow.

In step 207, establishing a new video connection between the first video server and the first surveillance equipment.

Then ends the flow.

In step 208, remaining the existing connection priority of the first surveillance unchanged.

Then ends the flow.

When multiple clients with different priorities access the same surveillance equipment, the connection priority of the surveillance equipment is the highest priority among priorities of all clients. If the surveillance equipment is accessed by a new client and the priority of the new client is higher than the connection priority of the surveillance equipment, then the connection priority of the surveillance equipment is set as the priority of the new client. If the priority of the new client is not higher than the connection priority of the surveillance equipment, then the connection priority of the surveillance equipment is unchanged. And bandwidth bottlenecks between regions are solved using the trunk management method based on the connection management of client priorities.

Furthermore, the step 207 of establishing a new video connection between the first video server and the first surveillance equipment includes the following sub-steps:

Determining whether the network bandwidth between the first video server and the first surveillance equipment reaches full load, and if it has reached full load, querying the lowest connection priority among/between the connection priorities of all the surveillance equipments connecting with the first video server.

If it does not reach full load, directly establishing a new video connection with the first surveillance equipment by the first video server and updating the connection priority of the first surveillance equipment as the priority of the first client.

It is all required to supply a service for each video request of the users when the network bandwidth does not reach full load. Video requests of users having low priorities will be denied when the network bandwidth is at full load, which can more reasonably utilize network resources according to the difference of the users' priorities.

After the step of querying the lowest connection priority among/between the connection priorities of all the surveillance equipments connecting with the first video server, if the network bandwidth has reached full load, the following steps are further included:

Disconnecting the connection with the surveillance equipment having the lowest connection priority by the first server, kicking away all clients connecting with the surveillance equipment having the lowest connection priority by the first server, and establishing a new video connection with the first surveillance equipment by the first server, the connection priority of the first surveillance equipment being updated as the priority of the first client, if the priority of the first client is higher than the lowest connection priority among/or between the connection priorities of all the surveillance equipments.

Denying providing a video service for the first client by the first server, that is, a video connection will not be established between the first video server and the first surveillance equipment, if the priority of the first client is not higher than the lowest connection priority among the connection priorities of all the surveillance equipments.

The bandwidth resource can be seized by the user having a high priority when the network bandwidth is at full load, thus the bandwidth resource of the user having a low priority will be seized. The video service is selectively supplied to the user, which can avoid congestion on networks, even a paralysis, and better control and manage the video traffic.

The video surveillance system further includes a cluster management server.

All querying, determining and updating steps are performed in the cluster management server.

The video server may collect information, such as the bandwidth occupied by every connection inside it, the connection priority and the load, etc., and then upload the collected information to the cluster management server. After to receiving these information, the cluster management server will perform statistics on these information and compute the total bandwidth which is required to be occupied by all the surveillance equipments connecting with the video server when the surveillance equipments are transmitting videos.

The second embodiment of the present invention relates to a trunk management method for video surveillance systems.

The second embodiment is basically same as the first embodiment, the main difference of them is: the video surveillance system further includes a second video server.

The first video server connects with the second video server by a backbone network with bandwidth limitations.

The client connects with the surveillance equipment through the first video server and the second video server, and the priority of the connection between the first video server and the second video server is the connection priority of the surveillance equipment.

The trunk management method for video surveillance systems includes the following steps:

sending a video service request to a first surveillance equipment by a first client;

establishing a new connection with the first video server by the first client;

determining whether there is an existing video connection between the first video server and the first surveillance equipment;

Establishing a new video connection with the first surveillance equipment through the second video server by the first video server, if there is not an existing video connection;

further querying priorities of all clients connecting with the first surveillance equipment, if there is an existing video connection, Updating the priority of the connection between the first video server and the second video server as the priority of the first client, if the priority of the first client is higher than the highest priority among the priorities of all the clients connecting with the first surveillance equipment; otherwise, remaining the existing connection priority of the priority of the connection between the first video server and the second video server unchanged.

A preferred embodiment of the present invention will be described in detail as following.

Figure 3:
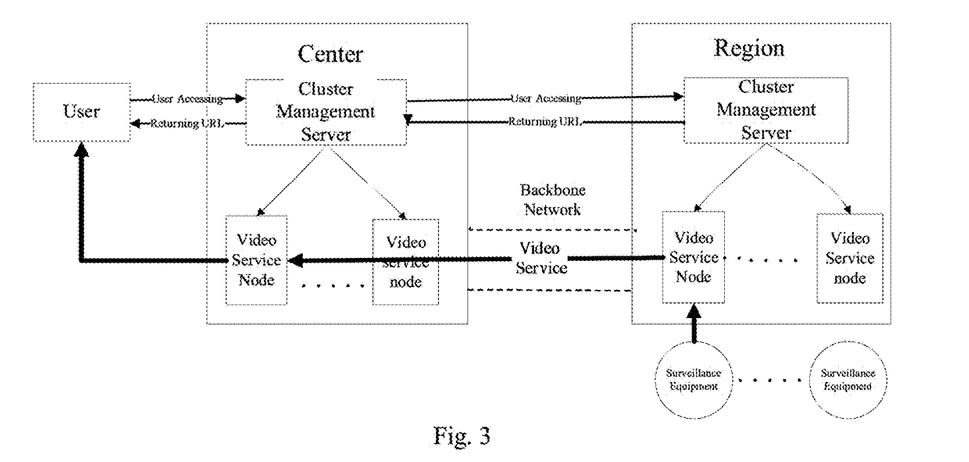
FIG. 3 shows a schematic diagram of a cross-regional video service of a video surveillance system according to the second embodiment of the present invention.

The application discloses a trunk management method based on the priority of the user to perform a traffic control and management on the backbone network with bandwidth limitations. The whole system is as shown in FIG. 3, every region has a video service cluster providing all kinds of video services for users, such as previewing, videoing and downloading, etc. The cluster management server is responsible for redirecting the accesses of users to the specific video service nodes and then the video service nodes will provide specific video services. The cross-regional video service is shown in FIG. 3. When in a central region the user accesses one regional surveillance equipment, the cluster management server of the central region will process the request of the user, execute a series of trunk management decisions and obtain an available URL to return to the user, then the user accesses, according to the URL, the regional surveillance equipment by means of cascading center-regions servers.

In this application, the trunk management refers to performing a traffic control on the trunk network having bandwidth limitations to prevent the trunk network reaching bandwidth bottlenecks using the particular strategies.

URL refers to the uniform resource descriptor. It is an identification method for comprehensively describing addresses of web pages and other resources on the Internet.

In this application, the priority refers to setting a value for each user, which is a parameter for determining the level of the priority of obtaining the video service by the user.

In this application, the node refers to a single server in the cluster for providing a video service function.

The trunk management method mainly includes the following three steps:

1. Controlling User Permission and Managing Connection Permission.

Figure 4:
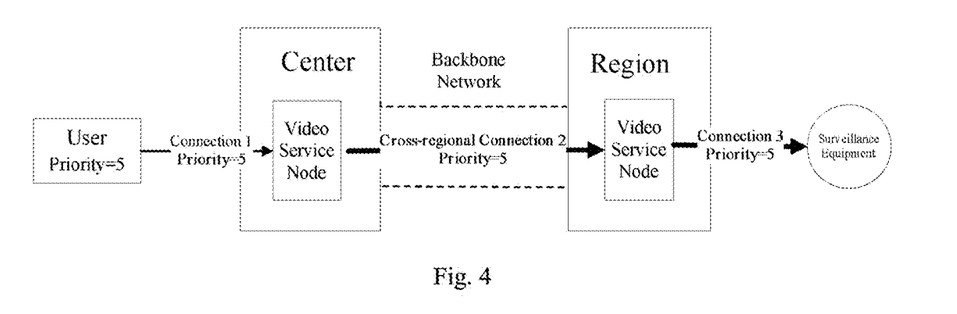
FIG. 4 shows a schematic diagram of passing the connection priority when a single-user performs a cross-regional previewing according to the second embodiment of the present invention.

The video surveillance system will distribute a user priority for every user, and every user request for video services will carry the priority of the user. A video service node will distribute a priority for every connection according to the priority of the user and will pass down the priority of the user along a link of a video service, when the video servcie node providing the video service for the user, as shown in FIG. 4; and the highest priority among the priorities of users will be passed down along the link of the video service, when multiple users with different priorities accessing same surveillance equipment, as shown in FIG. 5.

We will specifically describe the management of the connection permission by taking a previewing work as an example. As shown in FIG. 4, a user of the center previews one regional surveillance equipment. Firstly the user will establish a connection 1 between the user and a central video service node, then the central video service node will establish a connection 2 with a regional video service node, and the regional video service node will establish a connection 3 with the surveillance equipment finally; the priority of the connection will be passed along the link of the video service, the priority of the connection 1 equals to the priority of the user, the priorities of which being both 5, the priority of the connection 2 equals to the priority of the connection 1, and the priority of the connection 3 equals to the priority of the connection 2.

Figure 5:
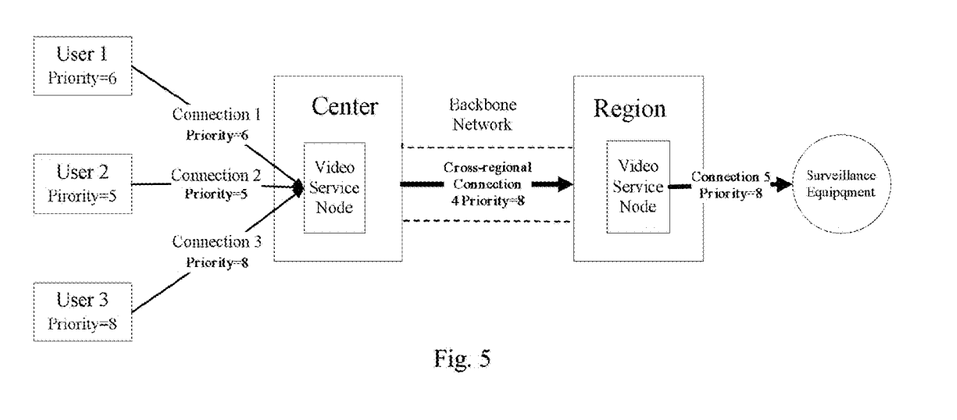
FIG. 5 shows a schematic diagram of passing the connection priority when multiple users perform a cross-regional previewing according to the second embodiment of the present invention.

When multiple users with different priorities access the same surveillance equipment, as shown in FIG. 5, e.g. when three users with priorities which are respectively 6, 5 and 8 access the same surveillance spot, the priorities of the connection 1, the connection 2 and the connection 3 between the users and the central video service node respectively equal to the priorities of three users. And the highest priority among the priorities of three users is chosen to be the priority of the connection 4 between the central video service node and the regional video service node, e.g. the priority of the connection 4 is 8. Then this priority is passed down continuously. Thus, the priority of the connection 5 between the regional video service node and the surveillance equipment is 8, too.

Figure 6:
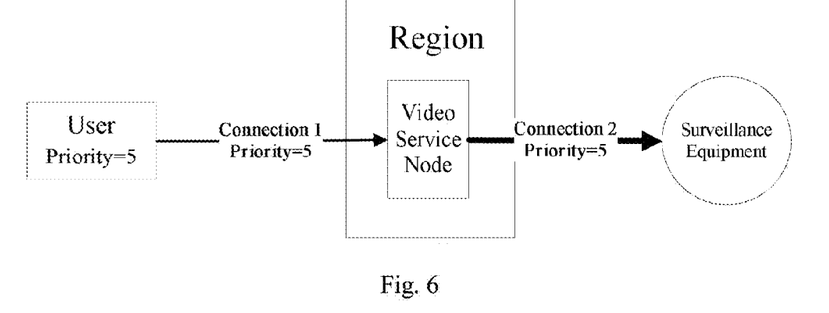
FIG. 6 shows a schematic diagram of passing the connection priority when a single user performs an intraregional previewing according to the second embodiment of the present invention.
Figure 7:
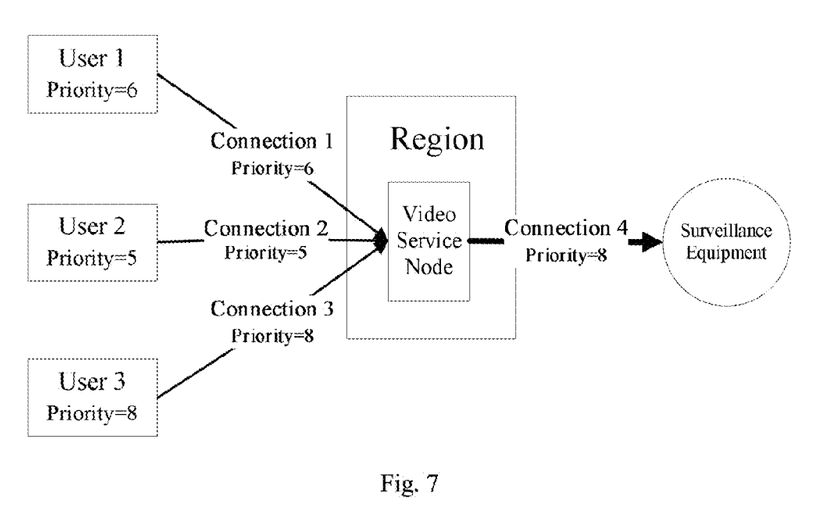
FIG. 7 shows a schematic diagram of passing the connection priority when multiple users perform an intraregional previewing according to the second embodiment of the present invention.

Similarly, FIG. 6 shows a schematic diagram of passing the connection priority when a single-user performs an intra-regional previewing; FIG. 7 shows a schematic diagram of passing the connection priority when multiple users perform an intra-regional previewing.

2. Collecting Bandwidths and Performing Statistics.

After finishing the previous step, the video service nodes within the cluster management server will collect information, such as the bandwidth occupied by every connection inside it, the connection priority, the connection type (intraregional connection or cross-regional connection) and the load, etc., and then upload the collected information to the cluster management server. After receiving these information, the cluster management server will perform statistics on these information and compute a total bandwidth occupy by all the connections of the backbone networks.

3. Executing a Trunk Management Strategy

After performing statistics on the connection information and the load information of all the video service nodes, the cluster management server executes a trunk management logic according to these information, there are some strategies as following when implementing the trunk management:

It is all required to supply a service for each video request of the users when the trunk network bandwidth does not reach full load.

The video request of the user having a low priority will be denied when the trunk network bandwidth is at full load, and it is required to give a friendly prompt to the user.

The bandwidth resource can be seized by the user having a high priority when the trunk network bandwidth is at full load, thus the bandwidth resource of the user having a low priority will be seized, when it is required to give a friendly prompt to the user.

Figure 8:
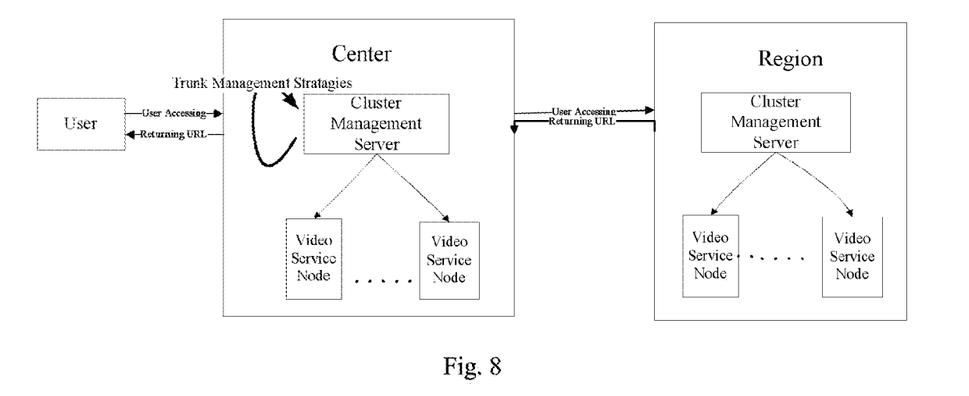
FIG. 8 shows a schematic diagram of directional selections for executing a trunk management according to the second embodiment of the present invention.

The execution of the trunk management strategy has directional selections. The strategy we base on is that the cluster management server in the region where the user sending a cross-regional service request lies is responsible for executing the trunk management strategy, while the trunk management strategy does not need to be considered by another region, thus the complexity of implementing the trunk management can be simplified. As shown in FIG. 8, when the user in the center sends a video request for a regional surveillance equipment, the central cluster management server will execute the trunk management strategy after receiving the user request.

The flow of the trunk management is executed in the cluster management server. As shown in FIG. 8, taking a video previewing service as an example, the cluster management server receives a user accesses for cross-regional previewing firstly, then detects whether the bandwidth of the backbone network has reached full load and whether the cluster is at full load; if the bandwidth of the trunk network has reached full load or the cluster is at full load, the lowest connection priority of all the first video servers and the second servers between the backbone networks is queried, and then whether the priority of the user access is higher than the lowest connection priority is determined. If it is higher than the lowest connection priority, then the cluster management server will send a command of kicking away the connection of the lowest priority to the video service node, and the video service node is chosen to provide a video service for the user. If the trunk network does not reach full load or the cluster is not at full load, an optimal video service node is chosen to provide a video service for the user.

Figure 9:
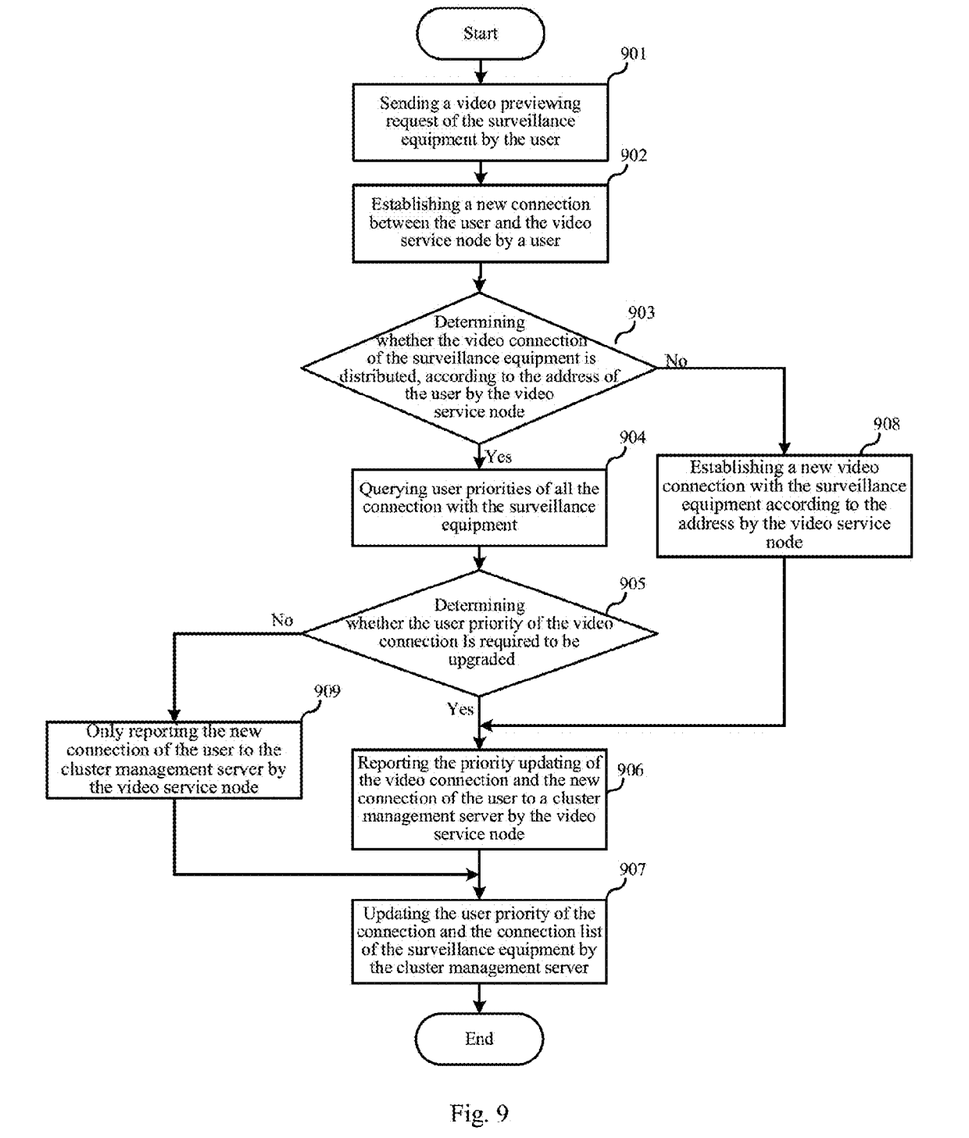
FIG. 9 shows a flow chart of upgrading the connection priority according to the second embodiment of the present invention.

FIG. 9 is a flow chart of upgrading a connection priority in the embodiment.

Specifically, it includes the following steps:

In step 901, sending a video previewing request for a surveillance equipment by a user.

Then proceeds to step 902, establishing a new connection with a video service node by the user.

Then proceeds to step 903, determining whether a video connection of the surveillance equipment is distributed, according to the address of the user by the video service node.

If it is, then proceeds to step 904; if it is not, then proceeds to step 908. In step 904, querying user priorities of all the connections with the surveillance equipment.

Then proceeds to step 905, determining whether the user priority of the video connection is required to be upgraded.

If it is, then proceeds to step 906; if it is not, then proceeds to step 909.

In step 906, reporting the priority updating of the video connection and the new connection of the user to a cluster management server by the video service node.

Then proceeds to step 907, updating the user priority of the connection and the connection list of the surveillance equipment by the cluster management server.

Then ends the flow.

In step 908, establishing a new video connection with the surveillance equipment according to the address by the video service node.

Then proceeds to step 906.

In step 909, only reporting the new connection of the user to the cluster management server by the video service node.

Then proceeds to step 907.

Figure 10:
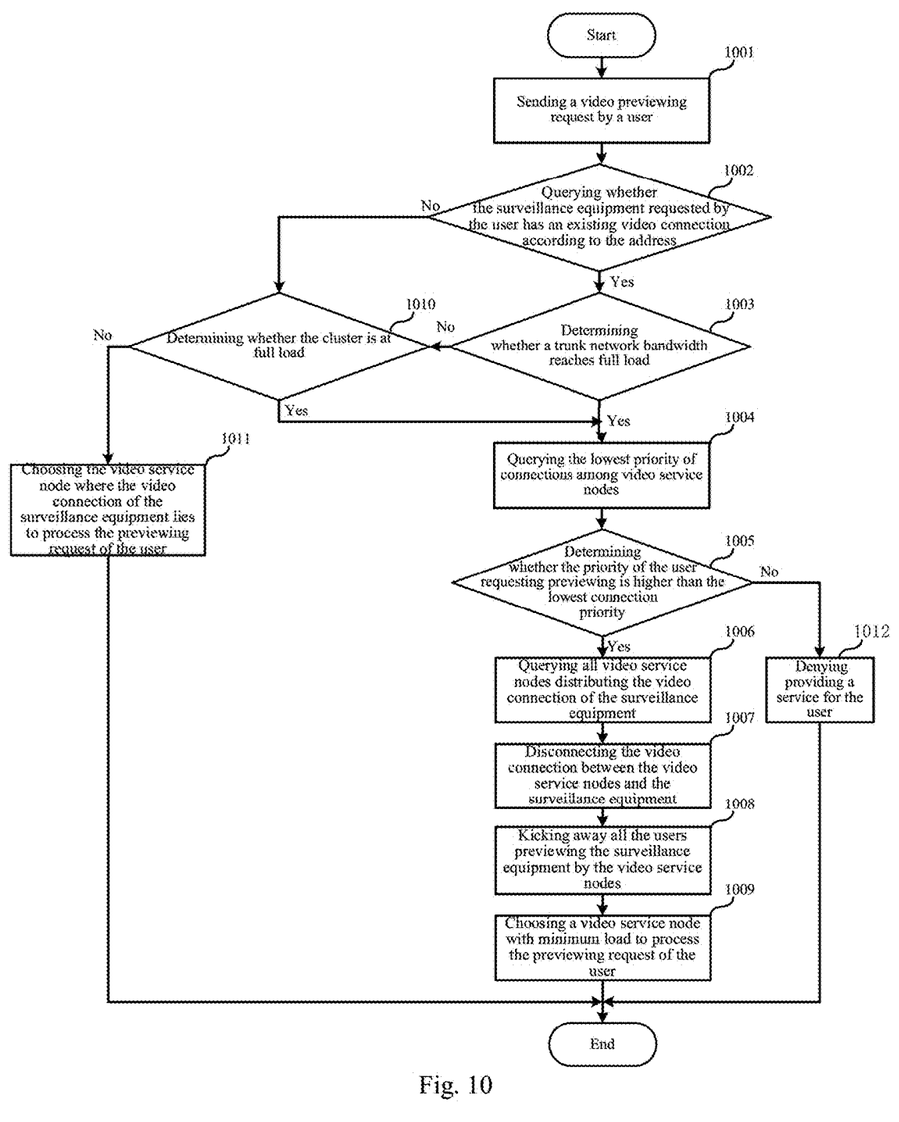
FIG. 10 shows a flow chart of processing a previewing request of a user by a management node according to the second embodiment of the present invention.

FIG. 10 shows a flow chart of processing a previewing request of a user by a cluster management server in the embodiment.

Specifically, it includes the following steps:

In step 1001, sending a video previewing request by a user.

Then proceeds to step 1002, querying whether the surveillance equipment requested by the user has an existing video connection according to the address.

If it is, then proceeds to step 1003; if it is not, then proceeds to step 1010.

In step 1003, determining whether a trunk network bandwidth reaches full load.

If it is, then proceeds to step 1004; if it is not, then proceeds to step 1010.

In step 1004, querying the lowest connection priority of connections among video service nodes.

Then proceeds to step 1005, determining whether the priority of the user requesting previewing is higher than the lowest connection priority.

If it is, then proceeds to step 1006; if it is not, then proceeds to step 1012;

In step 1006, querying all video service nodes distributing the video connection of the surveillance equipment.

Node, in this application, refers to a single server in the cluster for providing video service functions.

Distribution, in this application, refers to forwarding the video data, which is obtained by a video service node from a surveillance equipment, to multiple clients, and providing video services for multiple users at same time.

Then proceeds to step 1007, disconnecting the video connection between the video service nodes and the surveillance equipment.

Then proceeds to step 1008, kicking away all the users previewing the surveillance equipment by the video service nodes.

Then proceeds to step 1009, choosing a video service node with minimum load to process the previewing request of the user.

Then ends this flow.

In step 1010, determining whether the cluster is at full load.

If it is, then proceeds to step 1004; if it is not, then proceeds to step 1011.

In step 1011, choosing the video service node where the video connection of the surveillance equipment lies to process the previewing request of the user.

Then ends this flow.

In step 1012, denying providing a service for the user.

Then ends this flow.

The method embodiments of this invention all can be implemented by software, hardware and firmware etc. No matter this invention is implemented by software, or hardware, or firmware, instruction codes all can be stored in the memory (such as permanent or revisable, volatile or non-volatile, solid or non solid, fixed or exchangeable media etc) that any type of computers can access. Likewise, the memory can be such as programmable array logic (PAL), random access memory (RAM), programmable read only memory (PROM), read-only memory (ROM), electrically erasable programmable ROM (EEPROM), floppy disc, optical disc, and digital versatile disc (DVD) etc.

Figure 11:
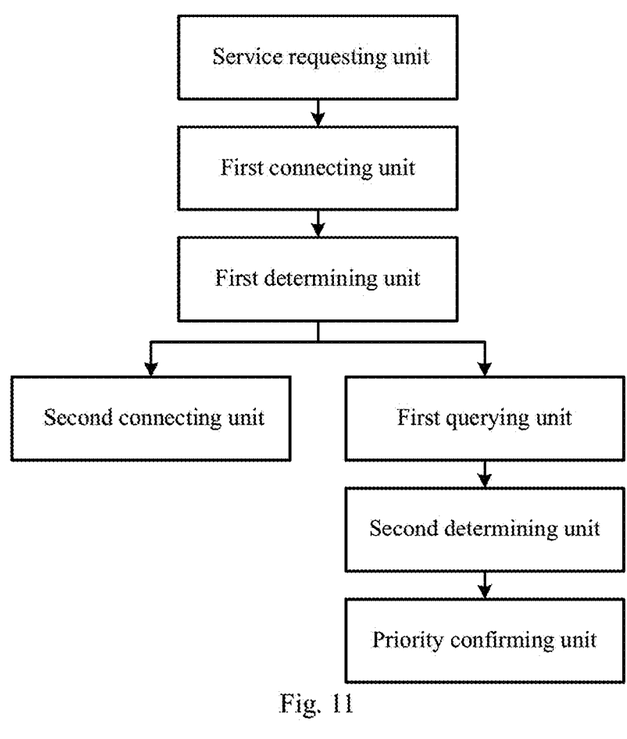
FIG. 11 shows a structure diagram of a trunk management apparatus for video surveillance systems according to the third embodiment of the present invention.

The third embodiment of the present invention relates to a trunk management apparatus for video surveillance systems. FIG. 11 shows a structure diagram of the trunk management apparatus for video surveillance systems. The video surveillance system includes a first video server, multiple clients and multiple surveillance equipments, and a priority is distributed to every client by the video surveillance system in advance, Specifically, as shown in FIG. 11, the trunk management apparatus for video surveillance systems includes:

A service requesting unit configured to send a video service request of a first client to a first surveillance equipment.

A first connecting unit configured to establish a new connection between the first client and the first video server.

A first determining unit configured to determine whether there is an existing video connection between the first video server and the first surveillance equipment.

A second connecting unit configured to establish a new video connection between the first video server and the first surveillance equipment, and set the connection priority of the first surveillance equipment as the priority of the first client, when the first determining unit determines that there is not an existing connection between the first video server and the first surveillance equipment.

A first querying unit configured to query priorities of all clients connecting with the first surveillance equipment, when the first determining unit determines that there is an existing video connection between the first video server and the first surveillance equipment.

A second determining unit configured to determine whether the priority of the first client is higher than the highest priority among the priorities of all the clients connecting with the first surveillance equipment.

A priority confirming unit configured to update the connection priority of the first surveillance equipment as the priority of the first client, when the second determining unit determines that the priority of the first client is higher than the highest priority among the priorities of all the clients connecting with the first surveillance equipment. And the priority confirming unit is configured to remain the existing connection priority of the first surveillance equipment unchanged, when the second determining unit determines that the priority of the first client is not higher than the highest priority among the priorities of all the clients connecting with the first surveillance equipment.

Furthermore, specifically, the second connection unit includes the following sub-units:

A third determining sub-unit configured to determine whether the network bandwidth between the first video server and the first surveillance equipment reaches full load.

A second querying sub-unit configured to query the lowest connection priority among the connection priorities of all surveillance equipments connecting with the first video server, when the third determining sub-unit determines that the network bandwidth between the first video server and the first surveillance equipment has reached full load.

A third connection sub-unit configured to directly establish a new video connection between the first video server and the first surveillance equipment, when the third determining sub-unit determines that the network bandwidth between the first video server and the first surveillance equipment does not reach full load.

Furthermore, specifically, the trunk management apparatus for video surveillance systems further includes:

A comparing unit configured to compare whether the priority of the first client is higher than the lowest connection priority among the priorities of all the surveillance equipments found by the second querying sub-unit.

A forth connecting unit configured to disconnect the connection between the first server and the surveillance equipment having the lowest connection priority, kick away all clients connecting with the surveillance equipment having the lowest connection priority, and establish a new video connection between the first server and the first surveillance equipment, when the comparing unit obtains that the priority of the first client is higher than the lowest connection priority among the connection priorities of all the surveillance equipments.

A service denying unit configured for the first video server to deny providing a video service for the first client, when the comparing unit obtains that the priority of the first client is not higher than the lowest connection priority among the connection priorities of all surveillance equipments.

Furthermore, preferably, the video surveillance system further includes a cluster management server.

All querying, determining and updating steps are all performed in the cluster management server.

The first embodiment is the method embodiment corresponding to this embodiment, and this embodiment and the first embodiment can be implemented in cooperation with each other. Correlated technical details disclosed in the first embodiment are still effective in this embodiment and will not be repeated here in order to reduce duplication. Correspondingly, correlated technical details disclosed in this embodiment can also be applied in the first embodiment.

The forth embodiment of the present invention relates to a trunk management apparatus for video surveillance systems.

The forth embodiment is basically the same as the third embodiment, the main difference of them is:

The video surveillance system further includes a second video server.

The first video server connects with the second video server by a backbone network with bandwidth limitations.

The client connects with the surveillance equipment through the first video server and the second video server, and the priority of the connection between the first video server and the second video server is the connection priority of the surveillance equipment.

The second embodiment is the method embodiment corresponding to this embodiment, and this embodiment and the second embodiment can be implemented in cooperation with each other. Correlated technical details disclosed in the second embodiment are still effective in this embodiment and will not be repeated here in order to reduce duplication. Correspondingly, correlated technical details disclosed in this embodiment can also be applied in the second embodiment.

It should be explained that units disclosed in apparatus embodiments of the present invention are logic units. Physically, a logic unit can be a physical unit, or a portion of a physical unit, or implemented in combination of several physical units. The physical implementing methods of these logic units themselves are not the most important; instead, the combination of functions achieved by these logic units is the key to solving the technical problem disclosed in the present invention. In addition, above apparatus embodiments of the present invention do not introduce the units which are not related closely to solving the technical problems disclosed in the present invention for highlighting creative portion of this invention, which does not indicate that above apparatus embodiments do not include other units.

It should be illustrated that relationship terms, e.g. first and second etc, only are used to distinguish one substance or operation from another substance or operation in claims and description of the present invention, rather than require or suggest that any practical relationships or orders exist between these substances or operations. Moreover, terms "including", "containing" or any other variants mean to include non-exclusive containing, so that processes, methods, objects or apparatus containing a series of elements not only include these elements but also other elements that are not clearly shown or inherent elements of these processes, methods, objects or apparatus. If there is no more limitation, elements limited by the phrase "include a" do not exclude other same elements in processes, methods, objects or apparatus containing these elements.

Although the present invention has been illustrated and described by referring to some preferred embodiments of the present invention, it should be understood by those skilled in the art that various other changes in forms and details may be made without departing from the principles and scope of the present invention.

What claimed is:

1. A trunk management method for a video surveillance system, the video surveillance system including a first video server, a plurality of clients each having a predetermined priority, and a plurality of surveillance equipment items, the first video server accessing the plurality of surveillance equipment items over a bandwidth-limited backbone network, the method comprising:

sending a video service request to a first surveillance equipment item of the plurality of surveillance equipment items by a first client of the plurality of clients;

establishing, by the first client, a new video session between the first video server and the first client;

determining whether there is an existing video session between the first video server and the first surveillance equipment item;

(i) if there is not an existing video session between the first video server and the first surveillance equipment, determining whether a network bandwidth between the first video server and the plurality of surveillance equipment items reaches full load, (a) if the network bandwidth does not reach full load, establishing, by the first video server, a new video session between the first surveillance equipment item and the first video server and updating a connection priority of the first surveillance equipment item as the priority of the first client, wherein the connection priority of each of the plurality of surveillance equipment items is a priority of the connection between the first video server and this surveillance equipment item, and (b) if the network bandwidth has reached full load, querying a lowest connection priority among connection priorities of all surveillance equipment items connected to the first video server, if the priority of the first client is higher than the lowest connection priority among the connection priorities of all surveillance equipment items connected to the first video server, disconnecting a connection between a surveillance equipment item having the lowest connection priority and the first video server, kicking away all clients connected to the surveillance equipment item having the lowest connection priority, and establishing, by the first video server, a new video session between the first surveillance equipment item and the first video server;

(ii) if there is an existing video session between the first video server and the first surveillance equipment item, querying priorities of all clients connected to the first surveillance equipment item;

(iii) determining whether the priority of the first client is higher than a highest priority among the priorities of all the clients connected to the first surveillance equipment item;

(a) if the priority of the first client is higher than a highest priority among the priorities of all the clients connected to the first surveillance equipment item, updating the connection priority of the first surveillance equipment item as the priority of the first client, and (b) if the priority of the first client is not higher than the highest priority among the priorities of all the clients connected to the first surveillance equipment item, the existing connection priority of the first surveillance equipment item is not updated;

wherein the connection priority of each surveillance equipment item of the plurality of surveillance equipment items is set to the highest priority among the priorities of all clients that are connected to that surveillance equipment item.

2. The trunk management method according to claim 1, wherein the video surveillance system further includes a cluster management server, and all querying, determining and updating is performed by the cluster management server.

3. The trunk management method according to claim 2, wherein the surveillance system further includes a second video server;

the first video server connects to the second video server by a backbone network with bandwidth limitations;

a client connects to a surveillance equipment item through the first video server and the second video server, and the priority of the connection between the first video server and the second video server is the connection priority of the surveillance equipment item;

the method includes the following steps:
sending a video service request to the first surveillance equipment item by the first client;
establishing, by the first client, a new video session between the first video server and the first client; and
determining whether there is an existing video session between the first video server and the first surveillance equipment item,
(i) if there is not an existing video session between the first video server and the first surveillance equipment, establishing item, by the first video server, a new video session between the first surveillance equipment item and the first video server through the second video server,
(ii) if there is an existing video session between the first video server and the first surveillance equipment item, further querying priorities of all clients connected to the first surveillance equipment item,
(a) if the priority of the first client is higher than the highest priority among the priorities of all the clients connected to the first surveillance equipment item, updating the priority of the connection between the first video server and the second video server as the priority of the first client,
(b) if the priority of the first client is higher than the highest priority among the priorities of all the clients connected to the first surveillance equipment item, the existing connection priority of the priority of the connection between the first video server and the second video server is not updated.

4. The trunk management method according to claim 1, wherein if the network bandwidth has reached full load, after the step of querying the lowest connection priority among the connection priorities of all the surveillance equipment items connected to the first video server, the method further comprises:
if the priority of the first client is not higher than the lowest connection priority among the connection priorities of all the surveillance equipment items, denying providing a video service for the first client by the first video server.

5. A trunk management apparatus for a video surveillance system, the video surveillance system comprising:

a first video server;
a plurality of clients and a plurality of surveillance equipment items;
the first video server accessing the plurality of surveillance equipment items over a bandwidth-limited backbone network;
wherein a priority is distributed to every client by the video surveillance system in advance,
wherein the trunk management apparatus includes a processor and a memory having computer-readable instructions that when executed by the processor performs a method, including:
sending a video service request of a first client of the plurality of clients to a first surveillance equipment item of the plurality of surveillance equipment items;
establishing a new video session between the first client and the first video server;
determining whether there is an existing video session between the first video server and the first surveillance equipment item;
(i) if there is not an existing video session between the first video server and the first surveillance equipment item, determining whether a network bandwidth between the first video server and the plurality of surveillance equipment items reaches full load,
(a) if the network bandwidth does not reach full load, establishing, by the first video server, a new video session between the first surveillance equipment item and the first video server and updating a connection priority of the first surveillance equipment item as the priority of the first client, wherein the connection priority of each of the plurality surveillance equipment items is a priority of the connection between the first video server and this surveillance equipment item, and
(b) if the network bandwidth has reached full load, querying a lowest connection priority among connection priorities of all surveillance equipment items connected to the first video server,
if the priority of the first client is higher than the lowest connection priority among the connection priorities of all surveillance equipment items connected to the first video server, disconnecting a connection between a surveillance equipment item having the lowest connection priority and the first video server, kicking away all clients connected to the surveillance equipment item having the lowest connection priority, and establishing, by the first video server, a new video session between the first surveillance equipment item and the first video server;
(ii) if there is an existing video session between the first video server and the first surveillance equipment item, querying priorities of all clients connected to the first surveillance equipment item; and
(iii) determining whether the priority of the first client is higher than a highest priority among the priorities of all the clients connected to the first surveillance equipment item;
(a) if the priority of the first client is higher than the highest priority among the priorities of all the clients connected to the first surveillance equipment item, updating the connection priority of the first surveillance equipment item as the priority of the first client, and
(b) if the priority of the first client is not higher than the highest priority among the priorities of all the clients connected to the first surveillance equipment item, the existing connection priority of the first surveillance equipment item is not updated;

wherein the connection priority of each surveillance equipment item of the plurality of surveillance equipment items is set to the highest priority among the priorities of all clients that are connected to that surveillance equipment item.

6. The trunk management apparatus according to claim 5, wherein the video surveillance system further includes a cluster management server, and all querying, determining and updating is performed by the processor of the cluster management server.

7. The trunk management apparatus according to claim 5, wherein if the network bandwidth has reached full load, and if the priority of the first client is not higher than the lowest connection priority among the connection priorities of all the surveillance equipment items, the processor denies providing a video service for the first client.

8. The trunk management apparatus for video surveillance systems according to claim 5, wherein the video surveillance system further includes a second video server;

the first video server connects to the second video server by a backbone network with bandwidth limitations; and the client connects to the surveillance equipment item through the first video server and the second video server, and the priority of the connection between the first video server and the second video server is the connection priority of the surveillance equipment item.

* * * * *

UNITED STATES PATENT AND TRADEMARK OFFICE
CERTIFICATE OF CORRECTION

| | |
|---|---|
| PATENT NO. | : 10,171,850 B2 |
| APPLICATION NO. | : 14/758003 |
| DATED | : January 1, 2019 |
| INVENTOR(S) | : Yang Zheng, Dajiang Huang and Zhenbo Chen |

Page 1 of 1

It is certified that error appears in the above-identified patent and that said Letters Patent is hereby corrected as shown below:

In the Claims

Column 13, Line 48, change "(b) if the priority of the first client is higher than" to -- (b) if the priority of the first client is not higher than --

Signed and Sealed this
Third Day of September, 2019

Andrei Iancu
*Director of the United States Patent and Trademark Office*